Dec. 9, 1924.

C. T. WEYMANN 1,519,093

ROAD MOTOR VEHICLE BODY

Filed Feb. 1, 1922   2 Sheets-Sheet 1

Inventor
C. T. Weyman
By Marks Clark
Attys.

Dec. 9, 1924.                                    1,519,093
C. T. WEYMANN
ROAD MOTOR VEHICLE BODY
Filed Feb. 1, 1922        2 Sheets-Sheet 2
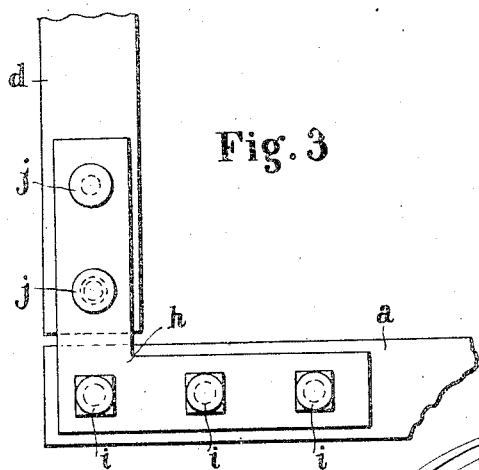
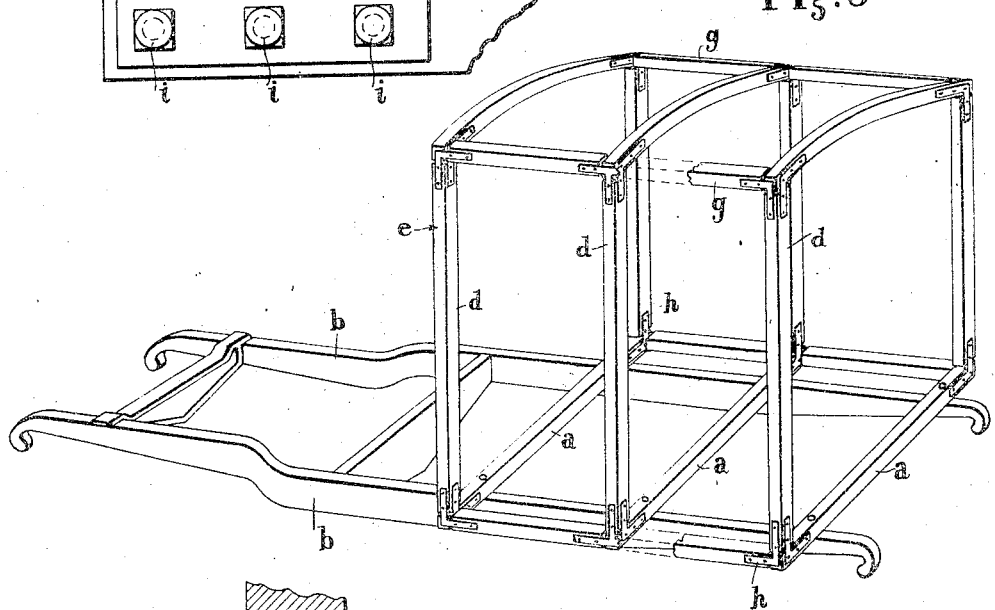
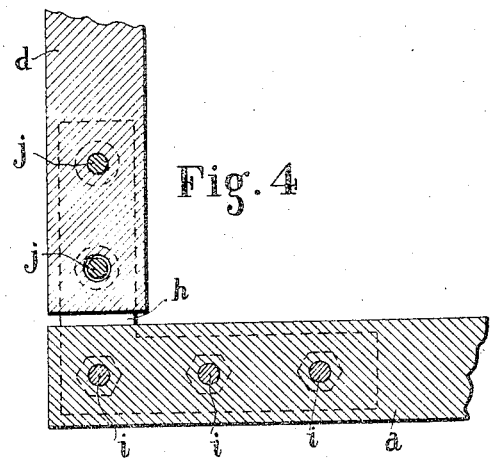
Inventor
C.T.Weymann
By Marks Clerk
Attorneys Patented Dec. 9, 1924.

1,519,093

UNITED STATES PATENT OFFICE.

CHARLES TORRES WEYMANN, OF PARIS, FRANCE.

ROAD-MOTOR-VEHICLE BODY.

Application filed February 1, 1922. Serial No. 533,459.

*To all whom it may concern:*

Be it known that I, CHARLES TORRES WEYMANN, a citizen of the French Republic, and resident of the city of Paris, France, have invented new and useful Improvements in Road-Motor-Vehicle Bodies, of which the following is a specification.

It has long been the practice to construct bodies for motor vehicles as rigidly as possible, and to this end such rigid bodies have been built up on two parallel base beams superimposed on and secured to the side sills of the frame of the chassis. The vertical posts or uprights of the body have been rigidly secured to these heavy beams in such a manner (as by mortises and glue) that play or relative movement between the parts has been eliminated as far as possible. To these vertical posts or uprights the top members also have been rigidly connected. The frame of a chassis, however, is subject to warping or distortion as the side sills twist or warp due to the irregularities in the road. This weaving or warping action, which practically cannot be eliminated, is transmitted to some extent to the body and the rigid body has been purposely made very heavy and the joints very rigid to withstand the racking and straining to which its parts and joints are subjected, but notwithstanding the considerable weight, strength and rigidity of such bodies their joints soon pull apart or loosen unduly, with the result that the body rattles and vibrates, and is very noisy.

The principal object of this invention is to construct a motor vehicle body so that it is flexible and hence free to weave or warp in harmony or synchronism with the chassis without danger of permanent distortion of the parts or pulling apart of the joints. To accomplish this object, the invention comprises the provision of flexible frames which are transversely arranged relative to and secured on the side sills of the chassis frame and connected together in such a manner, as by a flexible covering or panelling, that the frames, which are themselves flexible or distortable, may sway laterally as well as distort relative to each other when the chassis frame warps or weaves.

In the accompanying drawings,

Fig. 3 is a detail side perspective view illustrating one form of connection or joint adapted for flexibly securing the parts of the body together, and Fig. 4 is a cross section through the joined ends of two of the parts.

Fig. 5 is an enlarged perspective view showing the chassis frame and skeleton frame embodying the present invention.

Figure 1:
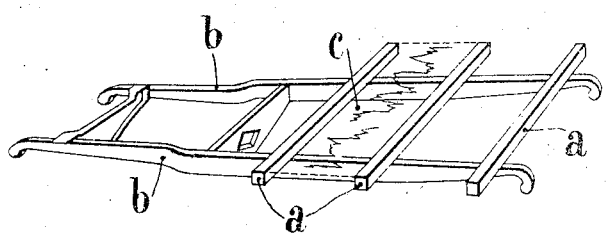
Fig. 1 is a perspective view showing somewhat diagrammatically the chassis frame and several of the lower transverse members of the flexible vertical transverse frames of a vehicle body embodying the present invention.
Figure 2:
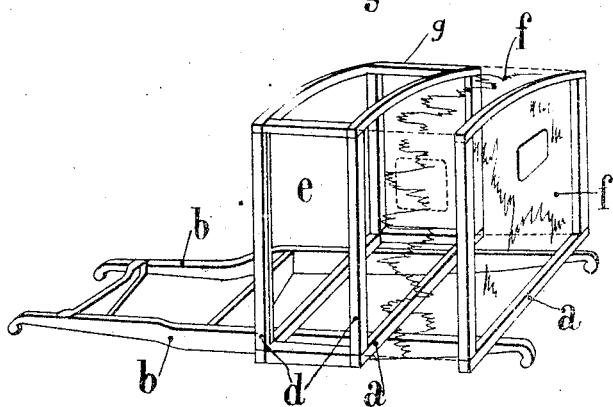
Fig. 2 is a similar view showing several of the flexible frames and illustrating the flexible panelling.

The present invention dispenses with the heavy side base beams, heretofore used, and in place of these beams transverse cross bars $a$ secured to the side sills $b$ of the chassis are provided. The flooring $c$ permits the bars $a$ to move relative to each other when the chassis weaves. Mounted on the ends of the cross bars $a$ are the vertical frames $e$ which comprise vertical posts or uprights $d$ connected at their tops by transverse curved pieces or bows. The frames $e$ may be suitably spaced apart by longitudinal spacing blocks or pieces $g$. The vertical frames are covered by a flexible covering $f$, which is used in place of the sheet metal heretofore employed and permits each flexible frame to flex or distort and the frames to sway laterally and also distort or flex relative to each other when the body weaves with the chassis.

To perfect the flexibility of the whole body, the elements of the skeleton frames of the body, (that is, the cross bars $a$, the posts or uprights, and other parts) are not rigidly connected together by joining wood to wood as by mortises, pegs or the like. The connection between the parts is so effected by means of iron fittings as to permit the associated or joined parts to move relative to each other. Figs. 3 and 4 illustrate a suitable form of iron fitting for accomplishing this function. As shown in these figures, as well as Fig. 5, L-shaped brackets $h$, formed of thin flexible metal, are secured by means of bolts, rivets or the like to and on opposite sides of the end portions of the two pieces to be joined. In the form of connection illustrated, the brackets are rigidly secured to the horizontal piece by bolts $i$ and flexibly connected to the vertical piece by bolts or rivets $j$. The vertical piece may move or swing about the upper rivet $j$ as an axis and the hole in the vertical piece through which the lower rivet projects is slightly larger than the rivet to permit this relative movement between the pieces. Both rivets *j* may have a little play so that one or the other acts as an axis dependent upon the particular warping action of the body.

From the foregoing, it will be apparent that the invention consists essentially in the construction of a road motor vehicle body which is flexible substantially throughout so that it may freely weave and warp with the chassis without any deleterious results, while at the same time the weight of the body may be considerably reduced. More particularly, the invention comprises the flexible transverse frames which may distort in themselves and flex relative to each other when the body weaves.

I claim:

1. In a road motor vehicle body, constructed to weave with the chassis frame, the combination of a skeleton comprising a plurality of transverse vertical frames, each flexible or distortable in itself, and a flexible covering around the skeleton and permitting the transverse, vertical frames to sway and flex relative to each other.

2. In a road motor vehicle body, constructed to weave with the chassis frame, the combination of a plurality of flexible transverse vertical frames adapted to be mounted directly on the side sills of the chassis and each comprising transverse and vertical members movable relative to each other, and means connecting the flexible frames and permitting flexing of said frames within their planes and transversely thereto.

3. In a road motor vehicle body constructed to weave with the chassis frame, the combination of a skeleton comprising vertical pieces and horizontal connecting pieces, connections between said pieces permitting each piece of the skeleton to move relative to the adjoining pieces, and a flexible covering around the skeleton.

4. In a road motor vehicle body constructed to weave with the chassis frame and comprising a plurality of transverse base pieces adapted to be mounted on the side sills of the chassis frame, connections secured to said base pieces, vertical pieces secured to said connections, connections at the tops of said vertical pieces, top members secured to said last mentioned connections and movable relative to the vertical pieces, and a flexible covering around the skeleton formed of said pieces.

5. In a road motor vehicle body constructed to weave with the chassis frame, and comprising a plurality of transverse base pieces adapted to be mounted on the side sills of the chassis frame with their ends projecting beyond the side sills, connections secure to the ends of said base pieces, vertical pieces secured to said connections which permit the vertical pieces to move relative to said base pieces, connections at the top of said vertical pieces, top members secured to said last mentioned connections which permit the top pieces to move relative to the vertical pieces, and a flexible covering around the skeleton formed of said pieces.

6. In a road motor vehicle body constructed to weave with the chassis frame, and comprising a skeleton formed of pieces movable relative to each other, and connections between the pieces and formed of iron fittings carrying axes on which the connected pieces move relative to each other.

7. In a road motor vehicle body constructed to weave with the chassis frame, the combination of a skeleton frame comprising a plurality of pieces, means for flexibly connecting the pieces so that each piece of the skeleton frame is movable relative to the adjoining pieces, and a flexible covering around the skeleton frame.

In testimony whereof I have affixed my signature.

CHARLES TORRES WEYMANN.